Figure 1:
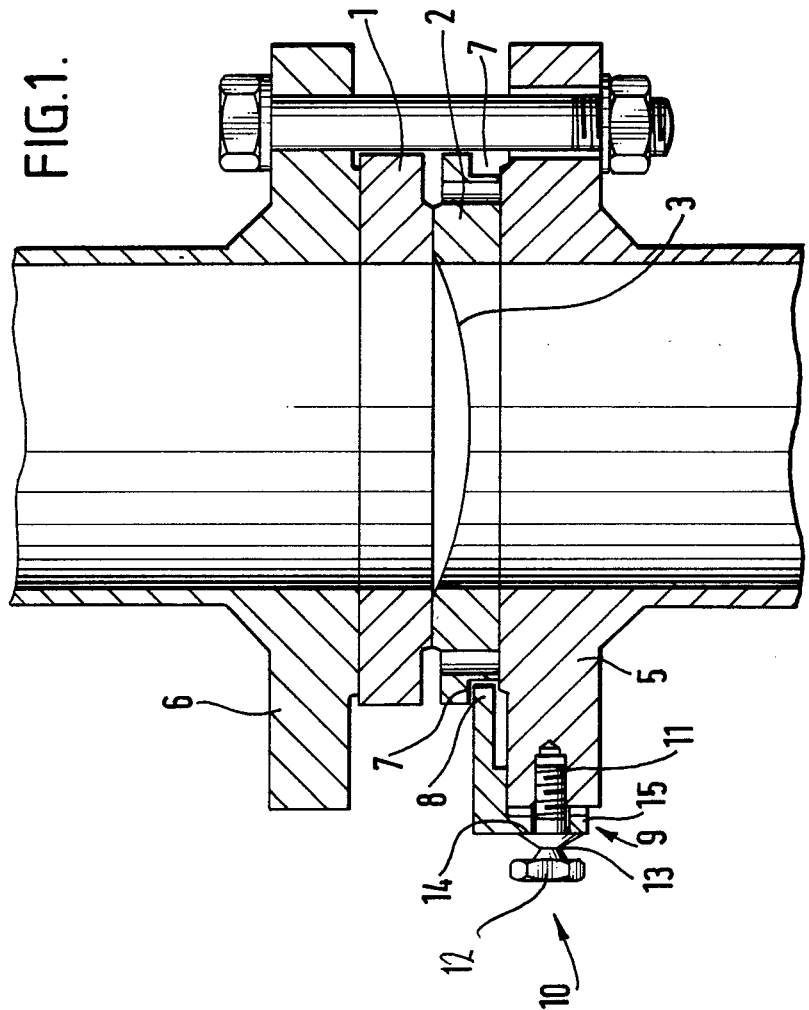

| United States Patent [19] | [11] Patent Number: 4,550,743 |
| --- | --- |
| McFarlane et al. | [45] Date of Patent: Nov. 5, 1985 |

[54] BURSTING DISC ORIENTATION DEVICE

[75] Inventors: Glenton P. McFarlane, Wembley; Steven G. Swift, Chelmsford, both of England

[73] Assignee: Johnson Matthey plc, London, England

[21] Appl. No.: 500,690

[22] Filed: Jun. 3, 1983

[30] Foreign Application Priority Data

Jun. 4, 1982 [GB] United Kingdom ............... 8216294

[51] Int. Cl.[4] .............................................. F16K 13/04
[52] U.S. Cl. .................................. 137/68.1; 220/89 A; 285/3; 285/408; 285/412
[58] Field of Search ............... 285/3, 4, 405, 410, 285/407, 406, 408, 412, 363; 137/68 A, 68 R, 315; 251/367; 220/89 A, 4 C

[56] References Cited

U.S. PATENT DOCUMENTS

| 2,856,096 | 10/1958 | Philip | 220/89 A |
| 3,266,115 | 8/1966 | Pedersen | 285/412 |
| 3,845,878 | 11/1974 | Carlson | 137/68 R |
| 3,900,223 | 8/1975 | Schafer et al. | 285/4 |
| 4,127,142 | 11/1978 | Snider | 285/3 |

FOREIGN PATENT DOCUMENTS

| 0083473 | 7/1983 | European Pat. Off. | 137/68 R |
| 2260200 | 1/1974 | Fed. Rep. of Germany | 137/68 R |
| 1360096 | 3/1964 | France | 220/89 A |

*Primary Examiner*—Martin P. Schwadron
*Attorney, Agent, or Firm*—Cushman, Darby & Cushman

[57] ABSTRACT

A bursting disc orientation device comprises a cut-away portion (7) on a predetermined one collar (2) of the bursting disc unit and cooperable with the cut-away portion, a projection (8) e.g. in the form of an arm of an angle bracket (9) secured to the periphery, or integral therewith, of that pipe flange (5) against which the said one collar (2) is required to bear. Thus, the unit can be prevented from being located between the pipe flanges of the bursting disc unit in other than a predetermined orientation in which the projection (8) is located in the cut-away portion (7). This improves the safety of the device.

4 Claims, 2 Drawing Figures

BURSTING DISC ORIENTATION DEVICE

This invention relates to a device for restricting the relative assembled positions of two units.

According to this invention, there is provided a device for restricting the relative assembled positions of two units wherein one unit includes a cut-away portion and the other includes a projection shaped to enter the cut-away portion so as to prevent assembly of the two units in other than a predetermined orientation.

The invention is particularly applicable to preventing a bursting disc unit from being located between pipe flanges in a wrong orientation. Bursting disc units are well known pressure safety device and may be of "normal" or "reverse" type. These are generally made of metal, such as stainless steel or an aluminium alloy and consist of a domed central portion which is integral with a surrounding flat annular flange. In use, this flange is clamped in a fluid-tight manner between first and second metal collars normally by means of threaded bolts which pass through the first collar and screw into tapped holes in the second, with the heads of the bolts recessed below the surface of the first collar and the ends of the bolts when screwed home not projecting beyond the surface of the second.

The resulting unitary combination of bursting disc and collars is generally, in turn, clamped in a fluid-tight manner between a pair of pipe flanges and, with 'normal' bursting discs, the arrangement is such that the higher pressure acts on the concave surface of the dome.

With a reverse bursting disc on the other hand, the higher pressure is arranged to act on the convex surface of the dome and, in this case, a cruciform assembly of cutting blades is disposed below the concave surface of the dome with their cutting edges facing the interior of the dome. Generally these cutting edges are arranged roughly in the plane of that surface of the bursting disc flange which is the more remote from the dome.

The nature and thickness of the material of the dome of a bursting disc and also the dimensions of the dome are carefully controlled so that at a temperature within a specified narrow temperature range, the dome of a normal bursting disc will burst outwards when the 'pressure difference', that is the difference between the pressures acting on the concave and convex surfaces of the dome, reaches a predetermined value.

In the case of a reverse bursting disc, the higher pressure acts on the convex surface of the dome of the disc so that at a predetermined pressure difference, the dome collapses inwards and is cut into two or more sections by the cutting blades. It is for this reason that such a disc is sometimes referred to as a "reverse buckling disc" or simply as a "buckling disc".

The lower limit of bursting pressure for a normal bursting disc, that is, the lower limit of the pressure difference at which the bursting of the dome will be effected, is typically, for a dome of 5 cm diameter, about 1.75 bars (that is, about 25 psi). If very thin aluminium foil is used for the dome, however, bursting pressures as low as about 300 millibars (about 4.5 psi) may be achieved.

A bursting disc having a bursting pressure in the region of 300 millibars is, however, a rather specialised, unconventional device which is difficult to manufacture, difficult to store and handle because of the fragility of the dome and prone to irregular and unpredictable failure. The lower bursting pressure of a conventional normal bursting disc should be regarded, therefore, as about 1.75 bars.

The present invention also includes a device for restricting the relative position of a bursting disc unit as herein defined between a pair of pipe flanges wherein one collar has a cut-away portion and a projection is attached to or forms a part of that pipe flange against which the said one collar is required to bear whereby the unit is prevented from being located between the pipe flanges in other than a predetermined orientation in which the projection is located in the cut-away portion.

Conveniently, the projection is formed separately from the said flange and may comprise a member secured to the flange. Preferably, the member is constituted by one arm of an angle bracket with the other arm secured to the periphery of the flange so that the first mentioned arm projects radially inwardly of the periphery and into the cut-away portion formed in the collar.

In order to reduce the possibility of removal of the angle bracket from the pipe flange, the said other arm is secured to the periphery of the pipe flange using a threaded bolt including an enlarged portion or shoulder and, when the bolt is screwed home, the shoulder and not the bolt head bears against the outer surface of the said other arm to hold the angle bracket in position. The bolt also includes a region of weakness between the bolt head and the shoulder so that when the bolt is screwed home, further tightening results in the head being sheared from the remainder of the bolt at the region of weakness, thereby leaving the enlarged portion to retain the angle bracket in position.

Conveniently, the enlarged portion is frusto-conical in shape with a relatively large subtended angle at the apex or projected apex of the cone thereby rendering removal thereof difficult by any wrench type device.

A device according to the present invention as applied to a bursting disc unit as herein defined is exceptionally useful to prevent the unit being assembled incorrectly. The potential consequences of a reverse or conventional bursting disc fitted incorrectly in a pipe-line are catastrophic in terms not only of plant failure but also possible loss of life. Bursting disc safety devices are not infrequently mounted in elevated positions in high pressure pipe-lines and it is not unusual for a unit to be replaced in conditions of darkness and in inclement weather. Under such conditions, it has been difficult hitherto for a maintenance fitter to ensure that the bursting disc unit is fitted in a correct orientation but the present invention overcomes the possibility of incorrectly assembling a bursting disc unit in a pipe-line.

Figure 2:
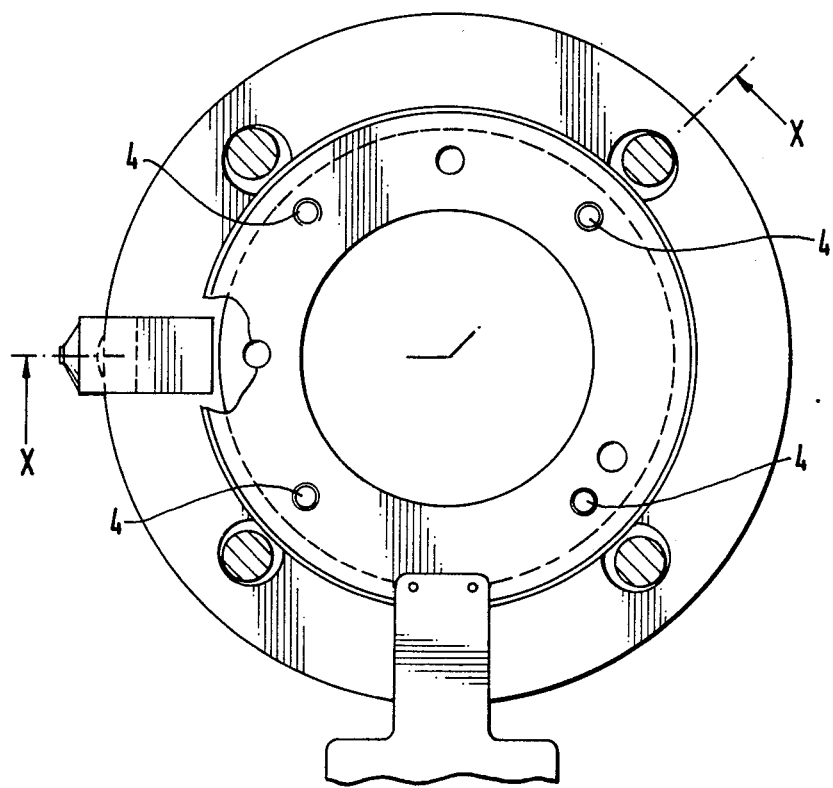

A reverse bursting disc unit in accordance with the present invention is shown in the accompanying drawings in which FIG. 1 is a section taken on line X—X of a plan view of FIG. 2.

In the drawings, the bursting disc unit has two annular collars 1 and 2 between which a metallic frangible disc 3 is clamped. The two collars are clamped together by four set screws 4 shown in FIG. 2 and, in turn, clamped between two pipe flanges 5 and 6. The collar 2 is formed with an annular recess 7 to receive one end 8 of one arm of an angled bracket 9 to which is secured to the periphery of a pipe flange 5 by means of a bolt 10. The bolt has a conventional threaded shank 11 and a conventional head 12. In addition the bolt 10 has a region of weakness 13 disposed between the head 12 and an enlarged shoulder 14 which, when the bolt is tightened, bears against arm 15 of the angled bracket 9. In order to prevent removal of the angled bracket 9 from the flange 5, further tightening of the bolt after the bolt has been screwed home, results in the head 12 being sheared away from the remainder of the bolt at the region of weakness 13. Thus, the remaining frusto-conically shaped portion including the shoulder 14 is difficult to remove using any normal wrench type spanner. Consequently unless resort is made to extreme measures, the angled bracket may for all practical purposes be regarded as permanently fixed to the flange 5.

We claim:

1. A device for restricting the relative position of a bursting disc unit between a pair of pipe flanges, said unit comprising a pair of annular collars with a frangible disc clamped therebetween, said device comprising a cut-away portion on a predetermined one collar of the bursting disc unit and a projection, which is cooperable with the cut-away portion and which is attached to or forms a part of that pipe flange against which the said one collar is required to bear whereby the unit can be prevented from being located between the pipe flanges in other than a predetermined orientation in which the projection is located in the cut-away portion, the projection comprising an angle bracket having a first arm, which is securable to the periphery of the flange and a second arm, which is locatable radially inwardly with respect to the periphery and disposable in the cut-away portion in the collar.

2. A device according to claim 1, wherein the first arm is securable to the periphery of the pipe flange using a threaded bolt including an enlarged portion or shoulder and the shoulder is engageable with the outer surface of the first arm.

3. A device according to claim 2, wherein the bolt has a region of weakness between the bolt head and the shoulder and the weak region of the bolt is shearable upon tightening the bolt.

4. A device according to claim 2, wherein the enlarged portion is frusto-conical in shape with a relatively large subtended angle at the apex or projected apex of the cone.

* * * * *